US 6,868,675 B1

(12) United States Patent
Kuhn et al.

(10) Patent No.: US 6,868,675 B1
(45) Date of Patent: Mar. 22, 2005

(54) APPARATUS AND METHOD FOR CONTROLLING COMBUSTOR LINER CARBON FORMATION

(75) Inventors: Terrel E. Kuhn, Mesa, AZ (US); William G. Freeman, Fountain Hills, AZ (US); Francis S. Maszk, Tempe, AZ (US); Douglas P. Freiberg, Phoenix, AZ (US); Kenneth A. Struzek, Gilbert, AZ (US); Lawrence A. Kobold, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/755,560

(22) Filed: Jan. 9, 2004

(51) Int. Cl.[7] ................................................ F02C 3/14
(52) U.S. Cl. ................................ 60/772; 60/752
(58) Field of Search ....................... 60/772, 752, 755, 60/756, 757, 804, 39.37

(56) References Cited

U.S. PATENT DOCUMENTS

| | | | | |
|---|---|---|---|---|
| 3,706,203 A | * | 12/1972 | Goldberg et al. | 60/757 |
| 4,151,713 A | * | 5/1979 | Faitani et al. | 60/747 |
| 4,194,358 A | * | 3/1980 | Stenger | 60/776 |
| 4,206,865 A | * | 6/1980 | Miller | 228/152 |
| 4,232,527 A | | 11/1980 | Reider | |
| 4,426,841 A | * | 1/1984 | Cornelius et al. | 60/39.23 |
| 5,261,223 A | | 11/1993 | Foltz | |
| 5,289,687 A | * | 3/1994 | Kress et al. | 60/747 |
| 5,375,420 A | * | 12/1994 | Falls et al. | 60/747 |
| 5,758,504 A | | 6/1998 | Abreu et al. | |
| 5,799,491 A | | 9/1998 | Bell et al. | |
| 5,918,467 A | | 7/1999 | Kwan | |
| 6,079,199 A | * | 6/2000 | McCaldon et al. | 60/800 |
| 6,434,821 B1 | * | 8/2002 | Nelson et al. | 29/888.01 |
| 6,442,940 B1 | * | 9/2002 | Young et al. | 60/748 |
| 6,546,731 B2 | | 4/2003 | Alkabie et al. | |
| 6,553,767 B2 | * | 4/2003 | Farmer et al. | 60/752 |
| 6,651,437 B2 | * | 11/2003 | Farmer et al. | 60/752 |
| 2003/0066821 A1 | | 4/2003 | Wybrow et al. | |

* cited by examiner

Primary Examiner—Ehud Gartenberg
(74) Attorney, Agent, or Firm—Robert Desmond, Esq.

(57) ABSTRACT

An apparatus and method for controlling combustor liner carbon formation is provided. The apparatus includes a dome subassembly that is removeably affixed to a modular outer panel subassembly and a modular inner panel subassembly. Each panel subassembly includes panels that are removeably affixed to one another.

29 Claims, 7 Drawing Sheets

APPARATUS AND METHOD FOR CONTROLLING COMBUSTOR LINER CARBON FORMATION

BACKGROUND OF THE INVENTION

This invention generally relates to combustor liners, such as those used on Honeywell TPE331-10, TPE331-11, and TPE331-12 series turbine aircraft engines and, more particularly, to apparatus and methods for controlling carbon formation within such combustor liners and constructing such combustor liners.

A turbine engine typically includes a compressor section, combustion section, and a turbine section. Within the combustion section is the combustor liner wherein fuel is burned producing a hot gas usually at an intensely high temperature. To prevent this high temperature heat from damaging the combustor liner before it exits to the turbine section, the interior of the combustor liner is provided with effusion holes and film cooling, and may include thermal barrier coating. This combustor liner can be created by securing a series of panels together in series with one panel being secured to a dome assembly. The effusion holes and film cooling, and thermal barrier coating, of the combustor liner prevents the intense combustion heat from damaging the combustor liner as well as the rest of the engine. The combustor liner, however, becomes very hot in the process.

A negative effect of the intense heat in the combustion process is the build-up of carbon on the combustion liner near the dome assembly. Over time, the carbon build-up can break off the combustion liner and pass through the turbine section. When this occurs, the carbon build-up may strike the turbine blades located therein, causing damage to those blades. This reduces the life span of the turbine blades and requires more frequent repairs to the engine.

Attempts to reduce carbon build-up have included U.S. Pat. No. 5,261,223 entitled "Multi-hole Film Cooled Combustor Liner With Rectangular Film Restarting Holes" wherein a combustor liner has a series of dilution holes and a plurality of rectangular cooling holes located downstream of the dilution holes. The dilution holes and cooling holes are located at various parts of the liner to prevent hot spots from forming in so-called "dry" areas. U.S. Pat. No. 5,758,504 entitled "Impingement/effusion Cooled Combustor Liner" discloses a combustor liner with a plurality of effusion holes in a predetermined pattern defining a centroid and with a plurality of impingement holes formed in a predetermined pattern to cool the temperature of the combustor liner. These attempts, however, leave room for increased efficiency in cooling and combustor liner replacement due to liner damage.

A combustor liner developed by the applicants herein is shown in partial cross-section in FIG. 1. In this combustor liner 100, a generally cylindrical outer liner subassembly 102 encloses a generally cylindrical inner liner subassembly 103, both of which are integrated (i.e., non-modular) with a dome subassembly 110. The inner liner subassembly 103 includes a plurality of inner panels 103a of decreasing diameter 113 with one of the panels 103a integrated with the dome subassembly 110. The inner panel integrated with the dome assembly 110 includes four rows of 181 effusion holes 104, while the panel that is second closest to the dome assembly includes five rows of 206 effusion holes 104.

Likewise, and as better shown in FIG. 2, the outer liner subassembly 102 is made up of plurality of outer panels 102a, of which one is integrated (i.e., non-modular) with the dome assembly 110. Each panel 102a has a decreasing diameter 112, (FIG. 1) to accommodate the attachment of the panels to one another. Eleven rows 106 of effusions holes 108 are in the outer panel 102a closest to the dome assembly 110. A first group 108 of seven rows 106, which are the closest rows to the dome assembly 110, has 239 effusion holes in each row. A second group 105b of four rows 106, which are the farthest rows to the dome assembly, has 281 effusion holes in each row. The effusion hole configuration, however, can stress the panel closest to the dome assembly 110, resulting in a shorter lifespan of the outer liner subassembly 102 and consequently the entire combustor liner 100 since the inner and outer liner subassemblies are integrated with the dome assembly.

As can be seen, there is a need for improved apparatus and methods that increase the efficiency of the combustor liner by decreasing carbon build-up on the inner and outer liner subassemblies, as well as by increasing the lifespan of the combustor liners. There is also a need to improve the ease of replacement of either the inner and/or outer liner subassemblies to eliminate the need to replace the entire combustor liner.

SUMMARY OF THE INVENTION

In one aspect of the present invention, a combustor liner comprises a dome subassembly; a modular inner panel subassembly removeably affixed to the dome subassembly; and a modular outer panel subassembly removeably affixed to the dome subassembly. The modular inner and outer panel subassemblies in the example are thermal barrier coated, although the present invention could also apply to subassemblies that are not thermal barrier coated.

In another aspect of the present invention, a combustor liner comprises a dome subassembly; an modular inner panel subassembly interfacing the dome subassembly; an outer panel subassembly interfacing the dome subassembly, the modular outer panel subassembly including six rows of first effusion holes proximate to the dome subassembly and wherein at least one of the six rows includes 239 first effusion holes; and five rows of second effusion holes distal to the dome subassembly and wherein at least one of the five rows includes 281 second effusion holes.

In yet another aspect of the present invention, a turbine engine comprises a compressor section; a turbine section; a combustor liner intermediate the compressor and turbine sections, the combustor liner including a modular outer panel subassembly having a first group of six rows of first effusion holes, wherein each of the six rows has at least 239 first effusion holes therein and a second group of five rows of second effusion holes, wherein each of the five rows has at least 281 second effusion holes therein, wherein the first and second effusion holes are configured in a plurality of equilateral triangles.

In yet a further aspect of the present invention, a method for reducing carbon build-up in a combustor liner comprises the steps of providing in a modular outer panel subassembly eleven rows of effusion holes proximate to a dome subassembly, dividing the eleven rows into a first group of six rows and a second group of five rows, the six rows being closest to the dome subassembly wherein at least one of the six rows has at least 239 effusion holes therein, the five rows being farthest from the dome subassembly wherein at least one of the five rows has at least 281 effusion holes therein; and moving air through the effusion holes.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a combustor liner that can be used on Honeywell TPE331-10, TPE331-11, and TPE331-12 series turbine aircraft engines, and could apply to other turbine aircraft engines. The combustor liner is modular in design and prevents the formation of carbon-build up on the inner surfaces of the modular inner and outer panel subassemblies by introducing sweeping air through a series of effusion holes located proximate to a dome assembly. These effusion holes are positioned in a configuration that minimizes stress to the panel. Also, the individual panels are configured with an angle that improves carbon removal and manufacturability. The modular design permits the shipment of completely finished inner and outer liner subassemblies, including drilling of effusion holes and thermal barrier coating, to facilitate repair of existing combustor liners. This is in contrast to past combustor liners that were integral in design and, thus, more difficult to repair. Also, the past effusion row/hole configuration tended to increase stress at a panel area that transitioned from flat to angled.

Figure 3:
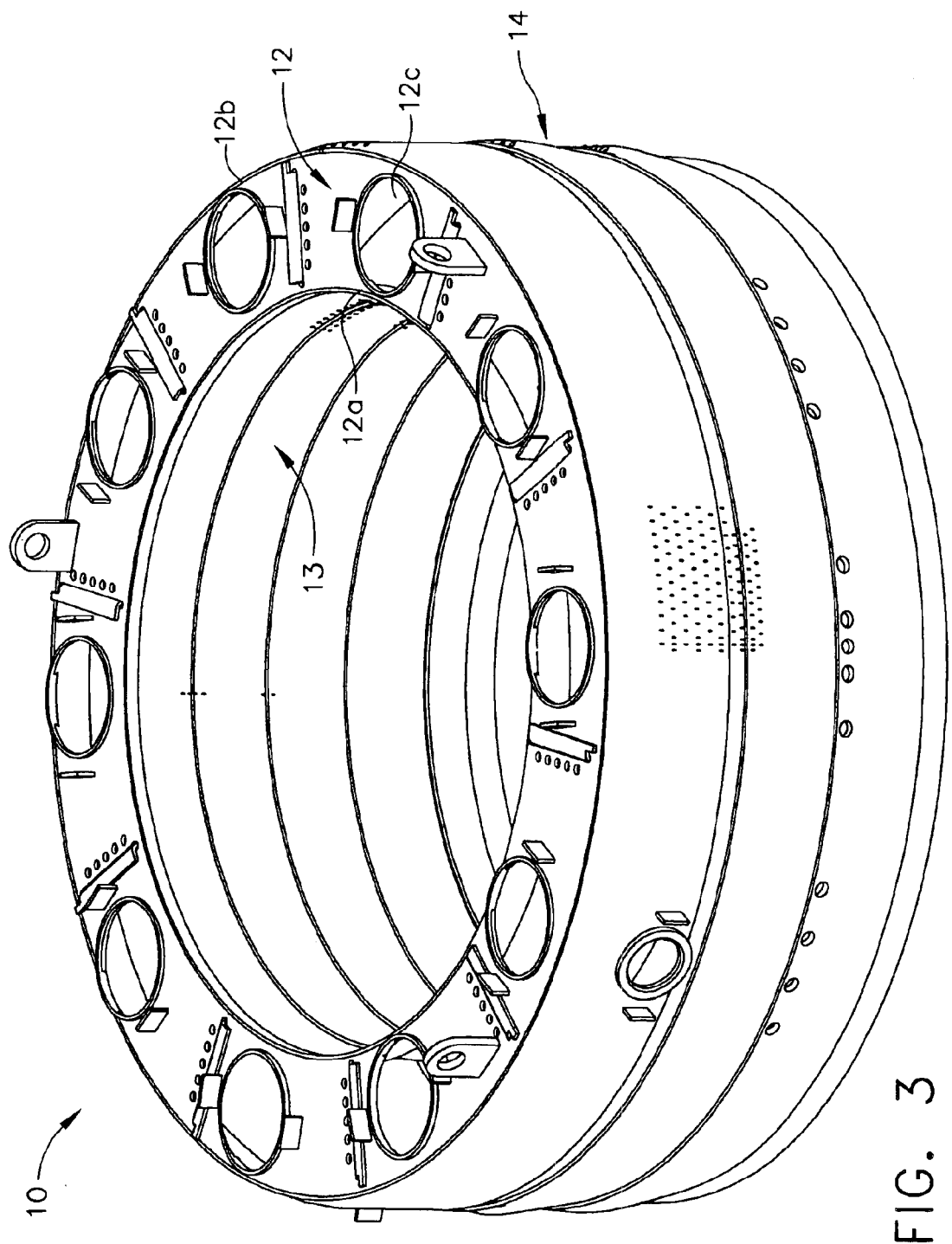
FIG. 3 is a perspective view of a combustor liner according to an embodiment of the present invention.

As shown in FIG. 3, an embodiment of the combustor liner 10 of the present invention may comprise a generally cylindrical, modular inner panel subassembly 13 encircled by a modular outer panel subassembly 14, both of which are removeably affixed to a dome subassembly 12. Thereby, fuel and air may enter inlets 12c; combust between the panel subassemblies 13, 14; and exit from an outlet (not shown) at an end of the combustor liner 10 opposite the inlets 12c and into a turbine section (not shown).

Figure 4:
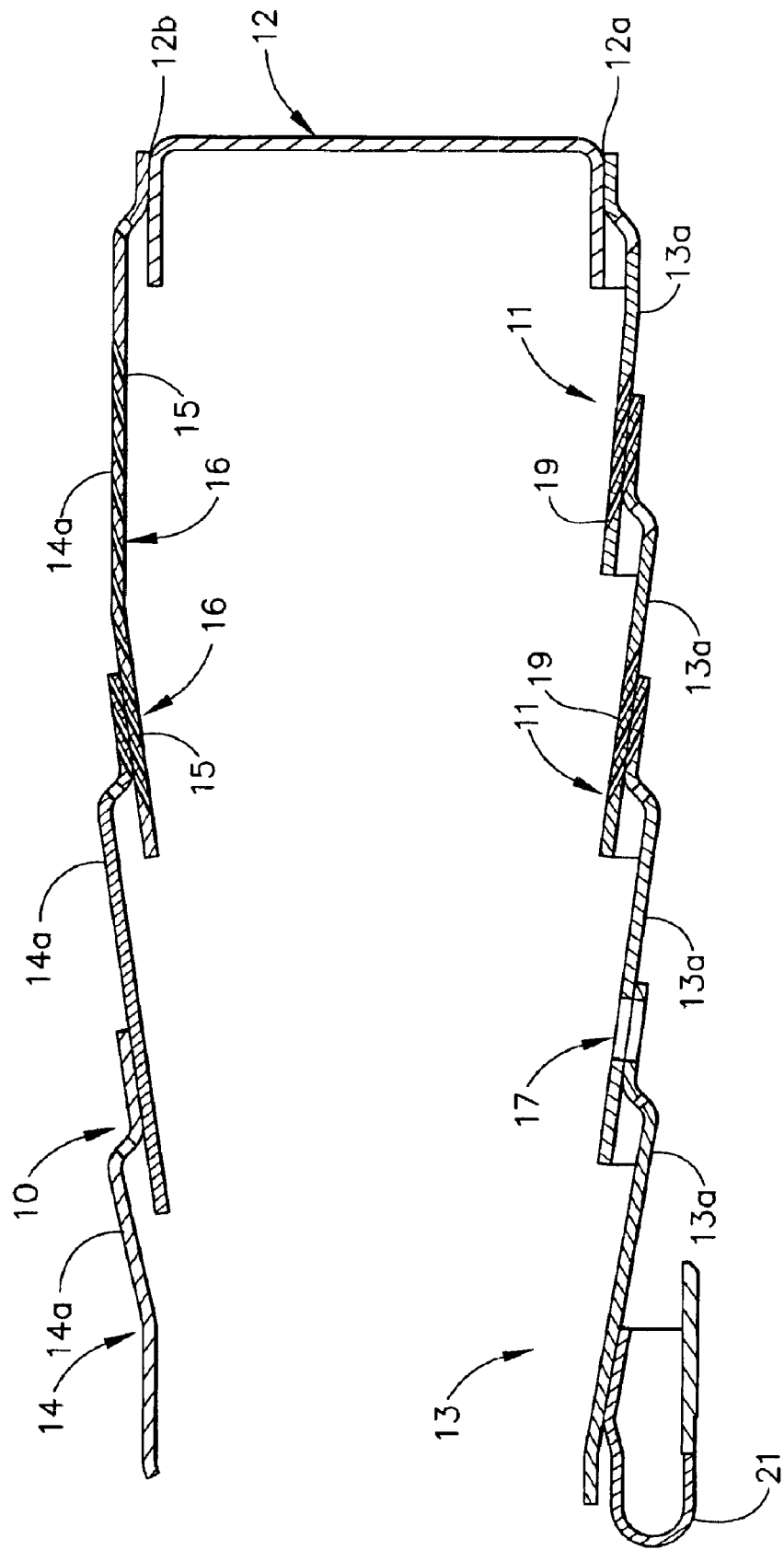
FIG. 4 is a partial, cross-sectional side view of a combustor liner according to an embodiment of the present invention.

In FIG. 4, a view of a combustor liner 10 shows a modular inner panel subassembly 13 with a plurality of serially connected inner panels 13a, which in this example includes four inner panels 13a. The inner panel 13a closest to the dome subassembly 12 may be removeably affixed, such as by welding and/or brazing, at a point 12a to the dome subassembly. The inner panel 13a that is most distal from the dome subassembly 12 may be removeably affixed, such as by welding and/or brazing, to a support 21 which mates with the turbine section.

The modular outer panel subassembly 14 may include a plurality of serially connected outer panels 14a, which in this example includes three outer panels 14a. The panel 14a closest to the dome subassembly 12 may be removeably affixed, such as by welding and/or brazing, at a point 12b to the dome subassembly. The panel 14a that is most distal from the dome subassembly 12 is left un-affixed and channels gas flow to the turbine section, by way of an outer transition liner (not shown). Each outer panel 14a and inner panel 13a may be affixed to one another, such as by welding and/or brazing. The braze alloys used for brazing any of the above may have differing melting points to facilitate brazing at one point without melting the braze at another point. The same may apply when welding.

As shown in FIG. 4, one or more of the inner panels 13a may include one or more of rows of dilution holes 17, as well as one or more rows 11 each having one or more effusion holes 19. The dilution holes 17 and/or effusion holes 19 may cover all or a portion of the entire circumference of the modular inner panel subassembly 13. For one embodiment, each dilution hole may have a diameter between $187/1000$ and about $229/1000$ inches. In the example shown in FIG. 4, the inner panel 13a closest to the dome subassembly 12 may include four rows 11, with each row 11 having the same or different number of effusion holes 19. In one embodiment, the four rows 11 may each have 181 effusion holes 19. The example of FIG. 4 also depicts the inner panel 13a that is the second closest to the dome subassembly 12 with five rows 11, with each row 11 having the same or different number of effusion holes 19. In an embodiment, the five rows 11 may each have 206 effusion holes 19.

As an example, the effusion holes 19 may have a diameter between about $17/1000$ to $23/1000$ inches, and be at an angle to a horizontal reference line between about 26 to 28 degrees.

Figure 5:
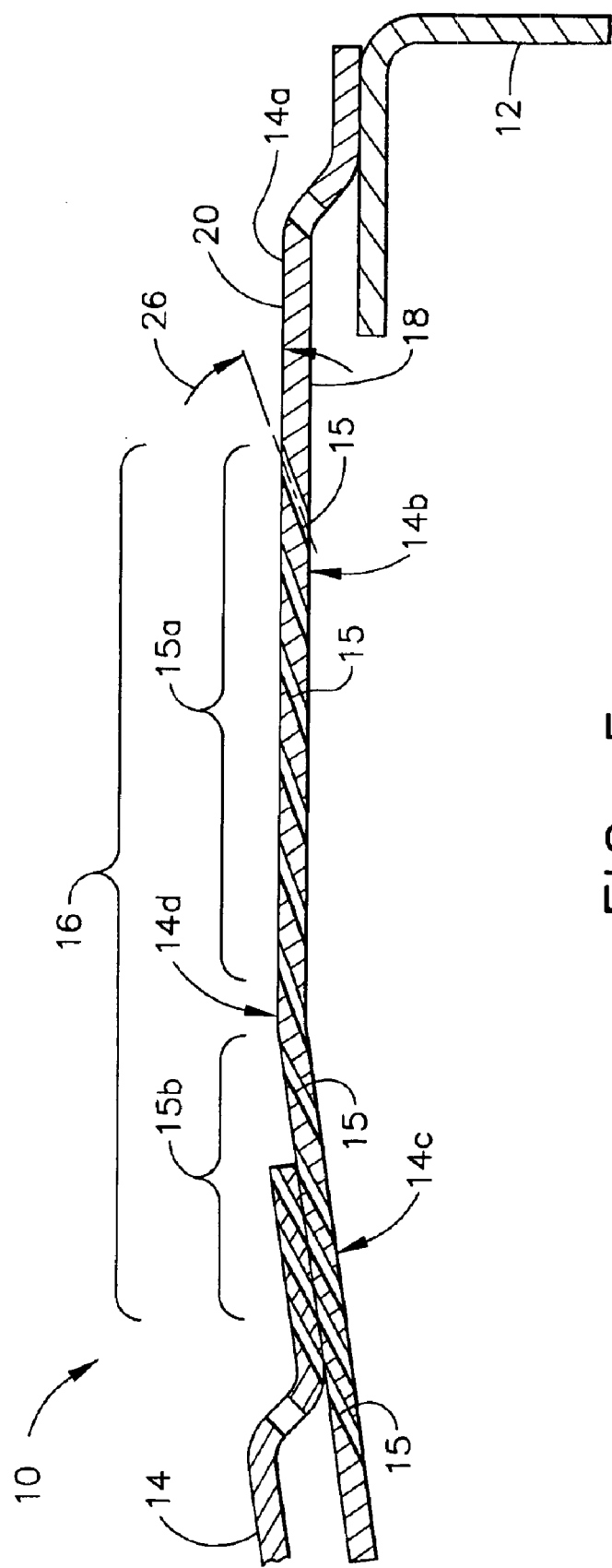
FIG. 5 is an enlarged, partial view of the outer panel shown in FIG. 4.

Similar to the inner panels 13a, and in referring to FIGS. 4 and 5, one or more of the outer panels 14a may include one or more of rows of dilution holes (not shown), as well as one or more of the outer panels 14a may include one or more of rows 16 each having one or a plurality of effusion holes 15. The dilution holes and/or effusion holes 15 may cover all or a portion of the entire circumference of the modular outer panel subassembly 14. For one embodiment, each dilution hole may have a diameter of about $230/1000$ inches. In the example shown in FIG. 4, the rows 16 may be divided into groups, such as a first group and a second group. In an embodiment, the outer panel 14a closest to the dome subassembly 12 may include a first group 15a, and as better shown in FIG. 5, of six rows 16, with each row 16 having the same or different number of effusion holes 15. In one embodiment, the six rows 16 may each have 239 effusion holes 15. The example of FIG. 4, and as better shown in FIG. 5, also depicts the outer panel 14a that is the closest to the dome subassembly 12 with a second group 15b of five rows 16 that are distal (in comparison to the first group 15a) from the dome subassembly 12, with each row 16 having the same or different number of effusion holes 15. In an embodiment, the five rows 16 may each have 281 effusion holes 15.

It should be understood that the number of dilution holes and rows of dilution holes, and number of effusion holes and rows of effusion holes is illustrative and not meant to be limiting. The number of effusion holes and number of rows can be dependent upon the specific dimensions of the combustor liner 10. Nevertheless, the number of possible combinations of numbers of rows of dilution and effusion and the number of dilution and effusion holes at any point along the outer panel 14a is extremely large. Therefore, adding/subtracting a row(s) and/or adding/subtracting a hole(s) in any row(s) is not necessarily obvious in terms of achieving a reduction in carbon build-up.

Referring to FIG. 5, it can be seen in the exemplary embodiment that the first group 15a of rows 16 can be on a relatively flat portion 14b of the outer panel 14a, while the second group 15b of rows 16 can be on a relatively angled portion 14c of the modular outer panel subassembly 14a. Between the flat portion 14b and angled portion 14c can be a transition area 14d of the modular outer panel subassembly 14a. In the past liner design shown in Figure 2, a similar transition area 102d between a flat portion 102b and angled portion 102c exists.

Figure 1:
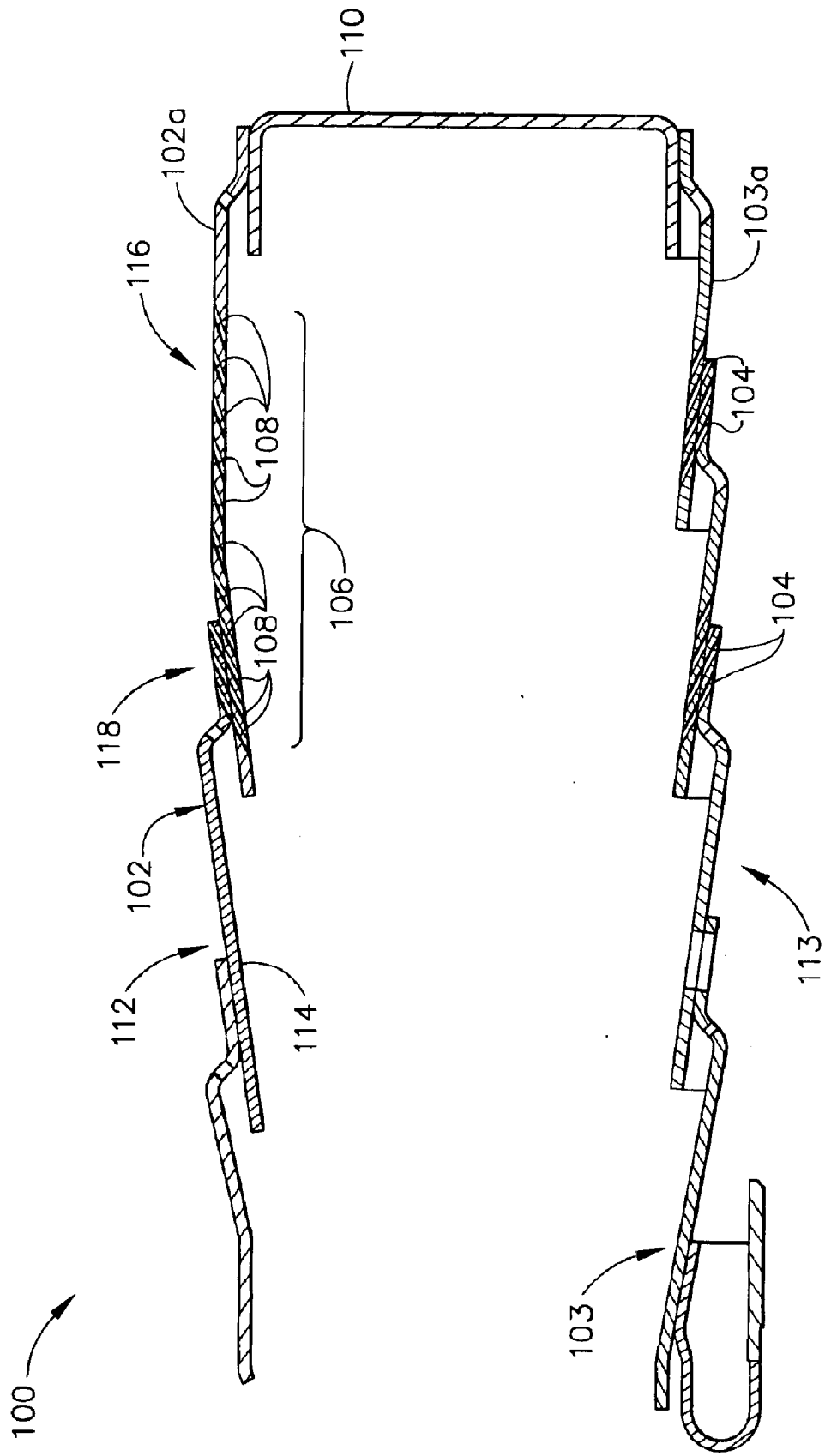
FIG. 1 is a partial, cross-sectional side view of a prior art combustor liner.
Figure 2:
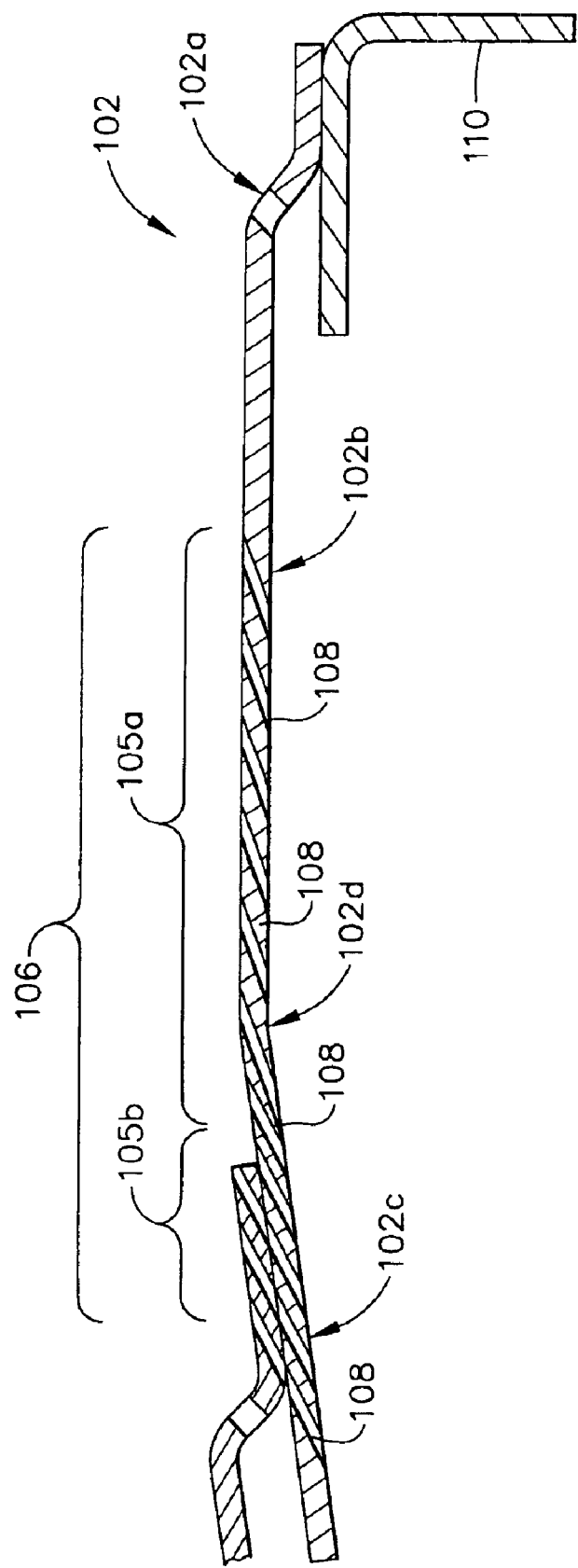
FIG. 2 is an enlarged, partial view of the outer panel subassembly shown in FIG. 1.

However, it can also be seen in FIG. 2 that the fifth and sixth rows of holes (starting from the left of the figure) straddle the transition area 102d, but do so in a configuration such that the holes from the fifth and sixth rows do not maintain the uniform separation seen between other adjacent rows, thereby causing stress in the transition area 102. In the embodiment shown in FIG. 5, the fifth and sixth rows likewise straddle the transition area 14d. But in contrast to the past design, the fifth and sixth rows of the present invention maintain the uniform spacing among adjacent rows.

In an exemplary embodiment, one or more of the effusion holes 15 can be at an angle 26 that is between about 15 and 25 degrees from a surface 20 of the outer panel 14a. About a 20 degree effusion hole angle 26 can be in another exemplary embodiment. It is understood by those skilled in the art that this range of angles for the effusion holes is illustrative, and not meant to be limiting. Also, there is no requirement that the angles 26 for each effusion hole be identical, but merely have a sufficient angle to create a film of sweeping air on the inner surface of the panel 14a.

Further, in this embodiment, one or more of the effusion holes 19, 15 of the modular inner and outer subassemblies can be generally circular in cross-section. Additionally, a diameter of the effusion hole 19, 15 can be between about $17/1000$ to $23/1000$ of an inch in size, and can be approximately $200/1000$ of an inch apart from a center of one effusion hole 19, 15 to another. However, there is no requirement that the diameters for each of the effusion holes 19, 15 be the same or different.

Figure 6:
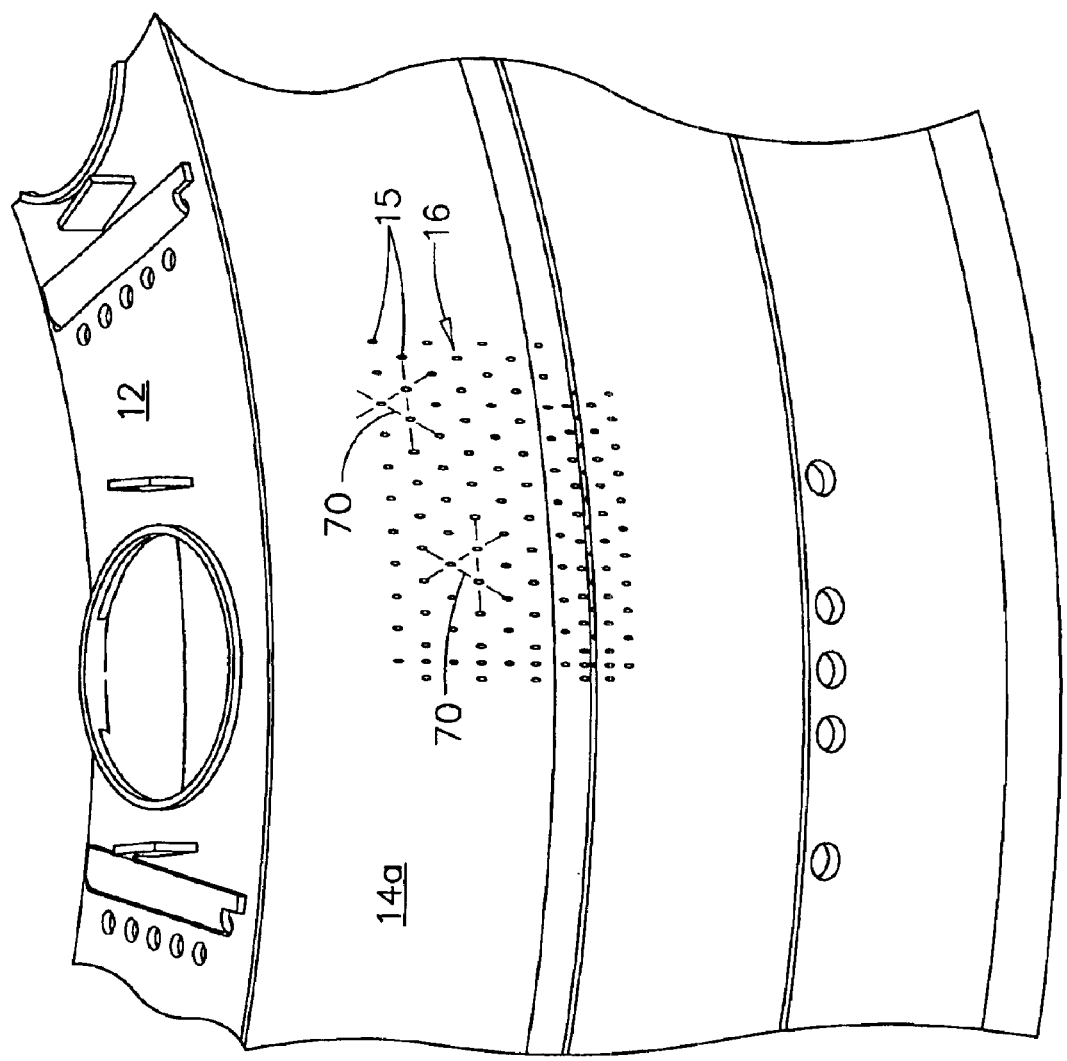
FIG. 6 is a partial side view of a modular outer panel subassembly and the dome subassembly of the present invention showing effusion holes configured in an equilateral triangle according to an embodiment of the present invention.

Additionally, as shown in FIG. 6, one or more of the rows 16 of effusion holes 15 in the modular outer panel subassemblies 13, can be offset from one another such that the holes 15 in adjacent rows 16 are positioned on apexes of an imaginary equilateral triangle 70. This equilateral triangular configuration 70 among adjacent rows of effusion holes maintains a uniform distance (although changing with the changing diameter of the modular outer panel 14a among the holes 15. Likewise, as shown in FIG. 4, one or more of the rows of effusion holes 19 in the modular inner panel subassemblies 13, can be offset from one another such that the holes 19 in adjacent rows are positioned on apexes of an imaginary equilateral triangle. This equilateral triangular configuration among adjacent rows of effusion holes maintains a uniform distance (although changing with the changing diameter of the modular inner panel 13a among the holes 19. In turn, the uniform configuration increases the durability of the modular inner and/or modular outer panels 13a, 14a.

Figure 7:
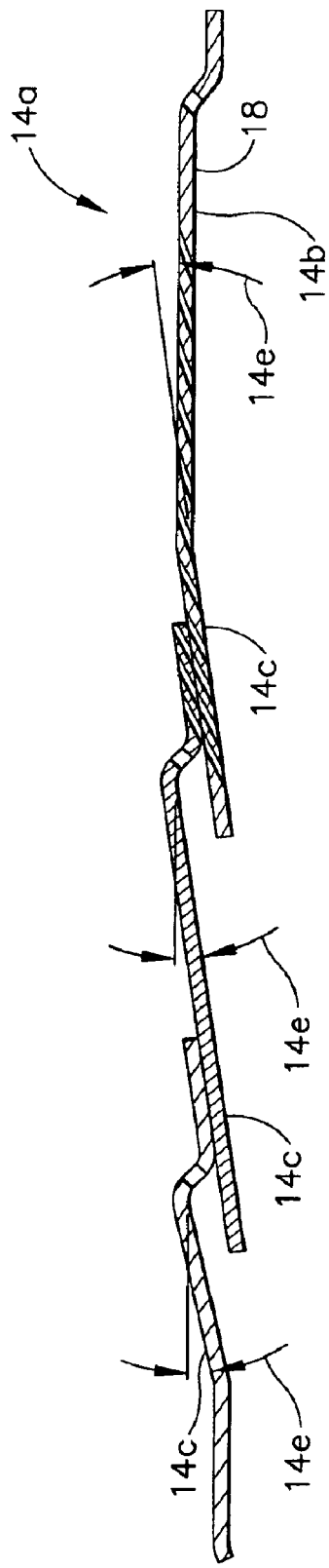
FIG. 7 is a cross-sectional view of the modular outer panel subassembly depicting the angles of the individual panels according to an embodiment of the present invention.

As mentioned above, the modular outer panel subassembly 14a may include a flat portion 14b and an angled portion 14c. In the exemplary embodiment of FIG. 7, the angled portion 14c may be characterized by an angle 14e measured from a surface 18. In this embodiment, each angle 14e is different from one another. More specifically, in this example, the angle 14e for the panel closest to the dome subassembly 12 (not shown) is about 6.99 degrees, the angle 14e for the panel furthest from the dome subassembly 12 is about 11.54 degrees, and the angle 14e for the intermediate panel is about 7.64 degrees.

Figure 8:
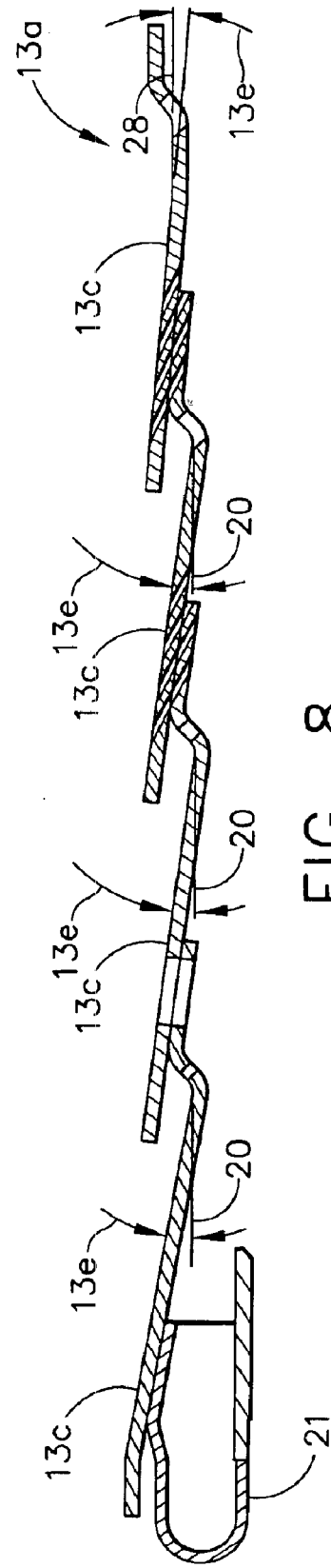
FIG. 8 is a cross-sectional view of the modular inner panel subassembly depicting the angles of the individual panels according to an embodiment of the present invention.

Similarly, as shown in FIG. 8, each inner panel 13a may include an angled portion 13c that can be characterized by an angle 13e as measured from a horizontal reference line 28. In this embodiment, and starting from the inner panel 13a that is most distal from the dome subassembly 12 (not shown), the angles may be 9.41, 5.48, 7.06, and 4.85 degrees. While the angles 13e, as well as the angles 14e may vary depending upon the application, such angles are important in that they can increase the efficiency of the combustor liner 10, in addition to its ease of manufacturability.

From the above, it can be appreciated that the present invention also provides a method for minimizing carbon-build up in a combustor liner. As an example, the method may include creating a film of air along an Interior surface of the modular inner panel subassembly and/or the modular outer panel subassembly. For the inner panel subassembly, the air film may be created by a plurality of rows of effusion holes in one or more inner panels. For the outer panel subassembly, the air film may be created by a plurality of rows of effusion holes in one or more outer panels. The plurality of holes in the outer panel(s) may be divided into a first group and a second group. The first group may have six rows, each with 239 effusion holes, while the second group may have five rows, each with 281 effusion holes.

Furthermore, it can be appreciated that the combustor liner 10 is provided with a modular design in that the components are removeably affixed to one another. In other words, and as an example, the dome subassembly may be removed from the inner panel and/or outer panel subassemblies 13, 14 by removing the welded and/or brazed areas at points 12a and/or 12b. Once the dome subassembly 12 is removed, one or more of the outer panels 14a can be removed from the remaining outer panels 14a. The same can occur for the inner panels 13a. Since the outer panel subassembly 14 is un-affixed to the transition liner, and the inner panel subassembly 13 is un-affixed to the turbine section, the entire outer panel subassembly 14 and/or inner panel subassembly 13 may be removed from the combustor liner without removing a fixation means. The modular inner and/or outer panel subassemblies can then be efficiently replaced by welding and/or brazing completely manufactured modular subassemblies, including effusion cooling holes and thermal barrier coating, to the dome subassembly. By using completely manufactured modular subassemblies, to repair existing combustor liners, the quality of the repaired combustor liners is better controlled resulting in improved functionality and reliability.

It should be understood, of course, that the foregoing relates to exemplary embodiments of the invention and that modifications may be made without departing from the spirit and scope of the invention as set forth in the following claims.

What is claimed is:

1. A combustor liner, comprising:
    a dome subassembly;
    a modular inner panel subassembly interfacing said dome subassembly;
    a modular outer panel subassembly Interfacing said dome subassembly, said outer panel subassembly including:
    six rows of first effusion holes proximate to said dome subassembly and wherein at least one of said six rows includes 239 first effusion holes; and
    five rows of second effusion holes distal to said dome subassembly and wherein at least one of said five rows includes 281 second effusion holes.

2. The combustor liner of claim 1, wherein said modular inner panel subassembly is removeably affixed to the dome subassembly.

3. The combustor liner of claim 1, wherein said modular outer panel subassembly is removeably affixed to the dome subassembly.

4. The combustor liner of claim 2, wherein said modular inner panel subassembly includes a plurality of inner panels affixed to one another.

5. The combustor liner of claim 3, wherein said modular outer panel subassembly includes a plurality of outer panels removeable affixed to one another.

6. The combustor liner of claim 2, wherein said modular inner panel subassembly includes:
    four rows of third effusion holes on one inner panel; and
    five rows of fourth effusion holes on another inner panel.

7. The combustor liner of claim 3, wherein:
    said six rows are on one outer panel; and
    said five rows are on another outer panel.

8. A The combustor liner of claim 6, wherein each of four rows of the inner panel subassembly includes 181 third effusion holes.

9. The combustor liner of claim 6, wherein each of five rows of the inner panel subassembly includes 206 fourth effusion holes.

10. The combustor liner of claim 7, wherein each of six rows of the outer panel subassembly includes 239 first effusion holes.

11. The combustor liner of claim 7, wherein each of five rows of the outer panel subassembly includes 281 second effusion holes.

12. A combustor liner, comprising:
    a dome subassembly;
    a plurality of inner panels removeably affixed to said dome subassembly, said inner panels including:
    four rows of first effusion holes proximate to said dome subassembly and wherein at least one of said four rows includes 181 first effusion holes; and
    five rows of second effusion holes distal to said dome subassembly and wherein at least one of said five rows includes 206 second effusion holes;
    wherein at least three of said first and second effusion holes are arranged in an equilateral triangle configuration;
    a plurality of outer panels removeably affixed to said dome subassembly, said outer panels including:
    six rows of third effusion holes proximate to said dome subassembly and wherein at least one of said six rows includes 239 first effusion holes; and
    five rows of fourth effusion holes distal to said dome subassembly and wherein at least one of said five rows includes 281 second effusion holes;
    wherein at least three of said third and fourth effusion holes are arranged in an equilateral triangle configuration.

13. The combustor liner of claim 12, wherein at least one of said first and second effusion holes is characterized by an angle between about 15 and 25 degrees.

14. The combustor liner of claim 12, wherein at least one of said first and second effusion holes is characterized by a diameter about $17/1000$ and $23/1000$ inches.

15. The combustor liner of claim 12, wherein at least two of said first and second effusion holes are separated by about $200/1000$ inches.

16. A turbine engine, comprising:
    a compressor section;
    a turbine section;
    a combustor liner intermediate said compressor and turbine sections, said combustor liner including:
    an modular outer panel subassembly having:
        a first group of six rows of first effusion holes, wherein each of said six rows has at least 239 first effusion holes therein and
        a second group of five rows of second effusion holes, wherein each of said five rows has at least 281 second effusion holes therein,
        wherein said first and second effusion holes are configured in a plurality of equilateral triangles.

17. The turbine engine of claim 16, wherein the combustor liner further comprises a modular inner panel subassembly.

18. The turbine engine of claim 16, wherein the combustor liner further comprises a dome subassembly that interfaces said modular inner and modular outer panel subassemblies.

19. The turbine engine of claim 16, wherein said inner panel subassembly includes a plurality of inner panels removeably affixed to one another by one of welding and brazing.

20. The turbine engine of claim 16, wherein said outer panel subassembly includes a plurality of outer panels removeably affixed to one another by one of welding and brazing.

21. The turbine engine of claim 16, wherein said modular inner panel subassembly interfaces with and is supported by the turbine section.

22. The turbine engine of claim 16, wherein said modular outer panel subassembly interfaces with and is supported by an outer transition liner, which directs gas flow to the turbine section.

23. The turbine engine of claim 16, wherein said modular outer panel subassembly includes an angled portion characterized by an angle between about 6.99 to 11.54 degrees.

24. The turbine engine of claim 17, wherein said modular inner panel subassembly includes an angled portion characterized by an angle between about 4.85 to 9.41 degrees.

25. A method for reducing carbon build-up in a combustor liner, comprising the steps of:
    providing in a modular outer panel subassembly eleven rows of effusion holes proximate to a dome subassembly,
    dividing said eleven rows into a first group of six rows and a second group of five rows,
    said six rows being closest to said dome subassembly wherein at least one of said six rows has at least 239 effusion holes therein,
    said five rows being farthest from said dome subassembly wherein at least one of said five rows has at least 281 effusion holes therein;

moving air through said effusion holes of the outer panel subassembly;

providing in a modular inner panel subassembly nine rows of effusion holes proximate to said dome subassembly, dividing said nine rows into a first group of four rows and a second group of five rows, said four rows being closest to said dome subassembly wherein at least one of said four rows has at least 181 effusion holes therein, said five rows being farthest from said dome subassembly wherein at least one of said five rows has at least 206 effusion holes therein; and moving air through said effusion holes of said inner panel subassembly.

26. The method of claim 25, wherein at least three of said effusion holes are arranged in an equilateral triangle configuration.

27. The method of claim 25, wherein at least one of said effusion holes is characterized by an angle between about 15 and 25 degrees.

28. The method of claim 25, wherein at least one of said effusion holes is characterized by a diameter of about $17/1000$ and $23/1000$ inches.

29. The method of claim 25, wherein at least two of said effusion holes are separated by about $200/1000$ inches.

* * * * *